United States Patent
Kai et al.

(10) Patent No.: US 8,121,308 B2
(45) Date of Patent: Feb. 21, 2012

(54) ARRANGEMENT STRUCTURE OF SOUND SYSTEM IN MOTORCYCLE

(75) Inventors: Takayuki Kai, Saitama (JP); Kazuhiko Mori, Saitama (JP); Atsushi Hatayama, Saitama (JP); Junichi Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1084 days.

(21) Appl. No.: 12/007,006

(22) Filed: Jan. 4, 2008

(65) Prior Publication Data

US 2008/0212793 A1    Sep. 4, 2008

(30) Foreign Application Priority Data

Jan. 9, 2007   (JP) .................. 2007-001629

(51) Int. Cl.
  *H04B 1/00*   (2006.01)
(52) U.S. Cl. ........................................................ 381/86
(58) Field of Classification Search ............... 381/86, 381/302, 24, 366; 455/345, 350, 351, 89, 455/99; 224/901; 280/27, 200, 203, 309, 280/311, 289, 202
See application file for complete search history.

(56) References Cited

U.S. PATENT DOCUMENTS

| | | | | |
|---|---|---|---|---|
| 5,185,804 A * | 2/1993 | Watanabe | ........................ | 381/86 |
| 5,434,753 A * | 7/1995 | Watanabe | ..................... | 361/814 |
| 5,705,976 A * | 1/1998 | Howard | ................... | 340/426.34 |
| 6,225,584 B1 | 5/2001 | Ase et al. | | |
| 6,483,428 B1 * | 11/2002 | Fish et al. | .................. | 340/425.5 |
| 6,785,531 B2 * | 8/2004 | Lepley et al. | ................. | 455/351 |
| 2006/0069499 A1 * | 3/2006 | Suzuki et al. | ................. | 701/200 |
| 2006/0238295 A1 * | 10/2006 | Konno et al. | ................ | 340/5.61 |

FOREIGN PATENT DOCUMENTS

JP    63-3583 Y2    1/1988

\* cited by examiner

*Primary Examiner* — Dao H Nguyen
*Assistant Examiner* — Tram H Nguyen
(74) *Attorney, Agent, or Firm* — Birch, Stewart, Kolasch & Birch, LLP

(57) ABSTRACT

To provide an arrangement structure of a sound system in a motorcycle which can ensure the operability of a sound operation unit while ensuring the visibility of a meter. In a motorcycle which arranges a meter indicating information on a vehicle and a sound operation unit for providing a reproduction operation or the like in a sound system in the vicinity of a steering portion, the meter and the sound operation unit are constituted as bodies separate from each other. The meter and the sound operation unit are arranged, as viewed in the axial direction of a head pipe which supports a steering portion, in front of and behind the head pipe.

20 Claims, 9 Drawing Sheets

ARRANGEMENT STRUCTURE OF SOUND SYSTEM IN MOTORCYCLE

CROSS-REFERENCE TO RELATED APPLICATIONS

The present application claims priority under 35 USC 119 to Japanese Patent Application No. 2007-001629 filed on Jan. 9, 2007 the entire contents thereof is hereby incorporated by reference.

BACKGROUND OF THE INVENTION

1. Field of the Invention

The present invention relates to an arrangement structure of a sound system in a motorcycle which includes a meter for indicating a speed and the like and a sound operation unit.

2. Description of Background Art

In general, a motorcycle is known which includes a meter for providing information on a vehicle such as speed and engine rotational speed. A sound operation unit provides a reproduction manipulation or the like in a sound system in the vicinity of a steering portion. In the conventional motorcycle of this type, the above-mentioned meter and sound operation unit are arranged in front of a head pipe as viewed in the axial direction of the head pipe. See, for example, JP-UM-B-63-3583.

However, when the meter and the sound operation unit are arranged in front of the head pipe, it is difficult for a rider to ensure the operability of the sound operation unit while ensuring the visibility of the meter.

Further, in the conventional constitution, the sound operation unit is arranged in front of the meter. Thus, it is necessary for the rider to extend his/her hand toward a front side of the meter to manipulate the sound operation unit. Accordingly, there exists a demand for the constitution which arranges the sound operation unit at a position which takes the operability of the rider into consideration.

SUMMARY AND OBJECTS OF THE INVENTION

Accordingly, it is an object of the invention to provide an arrangement structure of a sound system in a motorcycle which can overcome the above-mentioned drawbacks which the conventional technique possesses and can ensure the operability of a sound operation unit while ensuring the visibility of a meter.

According to an embodiment of the present invention, a sound system in a motorcycle is arranged with a meter indicating information on the vehicle and a sound operation unit which instructs a reproduction operation or the like in the sound system in the vicinity of a steering portion. The meter and the sound operation unit are constituted as bodies separate from each other. The meter is arranged, as viewed in the axial direction of a head pipe which supports the steering portion, in the vicinity of and in front of the head pipe, and the sound operation unit is arranged, as viewed in the axial direction of the head pipe, in the vicinity of and behind the head pipe.

According to an embodiment of the present invention, the meter and the sound operation unit are formed as the bodies separated from each other. Thus, compared to the constitution in which the meter and the sound operation unit are present in a mixture, the arrangement structure can enhance the visibility of these parts for a rider.

Further, the meter is arranged in the vicinity of and in front of the head pipe, and the sound operation unit is arranged in the vicinity of and behind the head pipe. Thus, compared to the constitution in which the meter and the sound operation unit are present in a mixture, the arrangement structure can enhance the visibility of these parts for a rider, and can ensure the operability of the sound operation unit.

The sound operation unit may include a plurality of operational portions for performing sound operations, and among the operational portions, the operational portion on sound volume control may be arranged in the vicinity of the steering portion and at an approximately center portion of the sound operation unit.

The sound operation unit may include a plurality of operational portions for performing the selection of stations or the like, and among the operational portions, the operational portion on sound volume control may be arranged in the vicinity of the steering portion and at an approximately center portion of the sound operation unit.

Among the plurality of operational portions, the operational portion on sound volume is operated with particularly high frequency. By arranging such an operational portion at the center portion, the operational portion can be performed more easily.

Further, the sound system may include a meter panel which extends rearwardly from a front side of the steering portion, and the meter and the sound operation unit may be arranged on the meter panel.

Due to such a construction, the meter and the sound operation unit are collectively arranged on the meter panel. Thus, the arrangement structure can further enhance the visibility of these parts for a rider.

According to an embodiment of the present invention, the meter and the sound operation unit are constituted as bodies separate from each other, the meter is arranged in the vicinity of and in front of the head pipe, and the sound operation unit is arranged in the vicinity of and behind the head pipe. Accordingly, a rider can ensure the operability of the sound operation unit while ensuring his/her visibility of the meter.

Among the plurality of manipulation portions for performing the sound operation or the selection of stations, by arranging the manipulation portion on the sound volume control which is operated with high frequency in the vicinity of the steering portion and at the approximately center portion of the sound operation unit, the rider can operate the operation portions more easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the invention is explained in conjunction with attached drawings.

Figure 1:
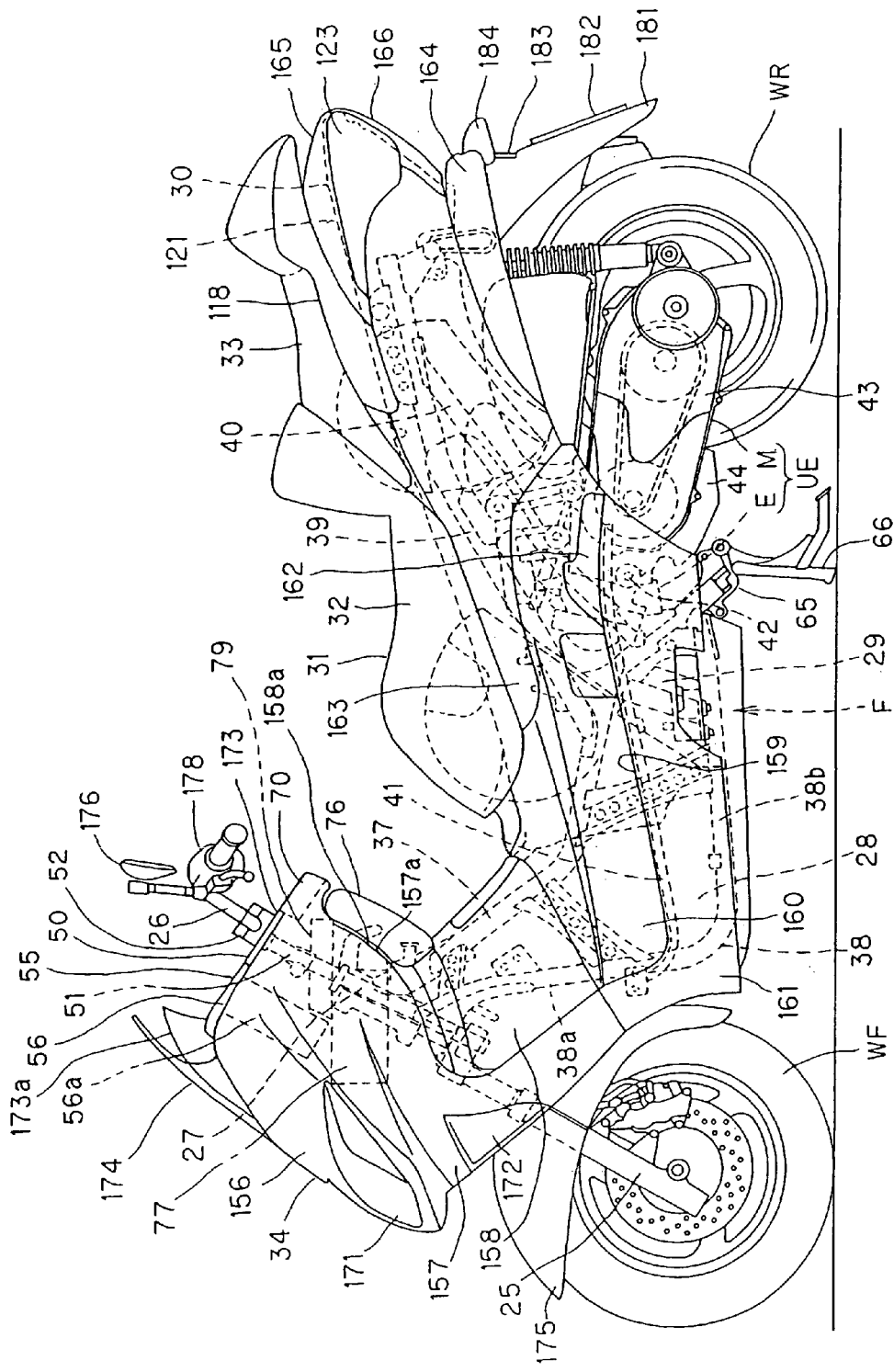
FIG. 1 is a side view showing one embodiment of a motorcycle according to the invention.

FIG. 1 is a left side view of a scooter-type vehicle. In this specification, the directions of "front," "rear," "left" and "right" are assumed by using the directions of "front," "rear," "left" and "right" of a vehicle as the reference.

In FIG. 1, a vehicle body frame F of a scooter-type vehicle which is a motorcycle mounts a front fork 25 which pivotally supports a front wheel WF and a head pipe 27 which steerably supports a steering handle 26 connected to the front fork 25 on a front end thereof. A unit swing engine UE which supports a rear wheel WR on a rear end thereof is vertically rockably supported on a longitudinally middle portion of the vehicle body frame F. A fuel tank 28 which is formed into a vertically elongated shape as viewed in a side view and a radiator 29 which is arranged behind the fuel tank 28 are mounted on the vehicle frame F in front of the unit swing engine UE. Further, on the vehicle body frame F, a storing box 30 is mounted in a state wherein the storing box 30 covers the unit swing engine UE from above. On the storing box 30, a rider's seat 31 having a front seat 32 and a rear seat 33 forming the tandem constitution is arranged. Further, a synthetic-resin-made vehicle body cover 34 which covers the vehicle body frame F, a front portion of the unit swing engine UE, the fuel tank 28, the radiator 29 and the storing box 30 is mounted on the vehicle body frame F.

The vehicle body frame F includes the head pipe 27, a pair of left and right down frames 37 which is contiguously mounted on the head pipe 27 and extends in the rearward and downward direction and a pair of left and right lower down frames 38 which have horizontal portions 38b thereof integrally and contiguously formed on rear ends of inclination portions 38a which are contiguously mounted on the head pipe 27 below the upper down frames 37 and extend in the rearward and downward direction with the rear ends thereof being welded to rear end portions of the upper down frames 37. A pair of left and right seat rails 39 extend in the rearward and upward direction from middle portions of both upper down frames 37 with a pair of left and right rear frames 40 connecting rear portions of the upper down frames 37 and rear portions of the seat rails 39. A pair of left and right support frames 41 are arranged outside the upper down frames 37 with the lower down frames 38 and the rear frames 40 and extending in the longitudinal direction.

Both support frames 41 support step floors 159 which are mounted on left and right sides of the vehicle body cover 34 from below, wherein front ends of both support frames 41 are joined to a lower portion of the inclination portion 38a of the lower down frame 38, and rear ends of both support frames 41 are joined to middle portions of the rear frames 40.

The vehicle body cover 34 includes a front cover 156 which covers a front portion of the head pipe 27 and an upper portion of the front wheel WF, a pair of left and right front side covers 157 which is joined to both left and right sides of the front cover 156 and a leg shield 158 which is joined to both front side covers 157 so as to cover leg portions of a rider riding on the front seat 32 from a front side as well as the head pipe 27 from behind. An inner cover 158a is arranged above the leg shield 158 and is joined to both front side covers 157 so as to cover the head pipe 27 from behind in the same manner as the leg shield 158. A pair of left and right floor center covers 160 extend in the rearward direction while being connected with the leg shield 158 and also form step floors 159 on lower end portions thereof. A pair of left and right floor side covers 161 extend downwardly from outer peripheries of the respective step floors 159 with a pair of left and right passenger steps 162 being mounted on rear portions of the above-mentioned step floors 159. A pair of left and right body side covers 163 is arranged below both sides of the riding seat 31 and is also contiguously mounted on the floor side covers 161 while extending in the rearward direction. A pair of left and right rear lower covers 164 is contiguously mounted on rear lower portions of the body side covers 163 with a rear upper cover 165 arranged between a rear bulging portion 121 of the storing box 30 and a rear portion of a grab rail 118. A rear center cover 166 is arranged between a pair of left and right tail light units 123 and is also connected to the rear upper cover 165 so as to cover the rear bulging portion 121 of the storing box 30 from behind.

On a rear fender 181 which covers the rear wheel WR from behind, a license plate 182, a reflector 183 and a license light 184 are mounted. The rear fender 181 is mounted on the rear bulging portion 121 of the storing box 30 together with the pair of left and right tail light units 123, and the rear upper cover 165 and the rear center cover 166 which are cover members for constituting a portion of the vehicle body cover 34.

A front fender 175 covers the front wheel WF from above and is supported on the front fork 25. A pair of left and right back mirrors 176 and a switch case 178 and the like which are provided for operating respective lamps are mounted on the steering handle 26. Head lights 171 are arranged between both sides of a front portion of the front cover 156 and front portions of the pair of left and right front side covers 157. Blinkers 172 are arranged on the front portions of both front side covers 157 below the head lights 171. A meter panel 173 on which meters and the like are arranged is joined to upper portions of the front cover 156, both front-side covers 157 and the leg shield 158, a meter visor 173a is integrally mounted on a front portion of the meter panel 173 in a state wherein the meter visor 173a is raised upwardly, and a wind shield 174 is arranged in front of the meter visor 173a.

The unit swing engine UE includes a water-cooled engine E which arranges a cylinder axis thereof approximately horizontally and a belt-type continuously variable transmission M which transmits an output of the engine E to the rear wheel WR by changing an output of the engine E using a transmission belt and pulleys in a continuously variable manner. The continuously variable transmission M drives a crankshaft-side drive pulley in response to an operation of an electric motor 42 which includes a transmission actuator so as to change a transmission ratio in a continuously variable manner. A transmission case 43 of the continuously variable transmission M is contiguously mounted on a left side of the crankcase 44 in the engine E in a state wherein the transmission case 43 projects from engine E, and the transmission case 43 extends to a left side of the rear wheel WR. Further, on rear ends of both down frames 37, that is, on lower ends of the down frames 37, brackets 65 are mounted, and main stands 66 are rotatably supported on both brackets 65. By making the main stands 66 stand upright, it is possible to make the scooter-type vehicle stand by itself with the rear wheel WR held in a floated state. When the scooter-type vehicle is in a traveling state, the main stands 66 may be stored in a state wherein the rear wheel WR comes into contact with a ground.

Figure 2:
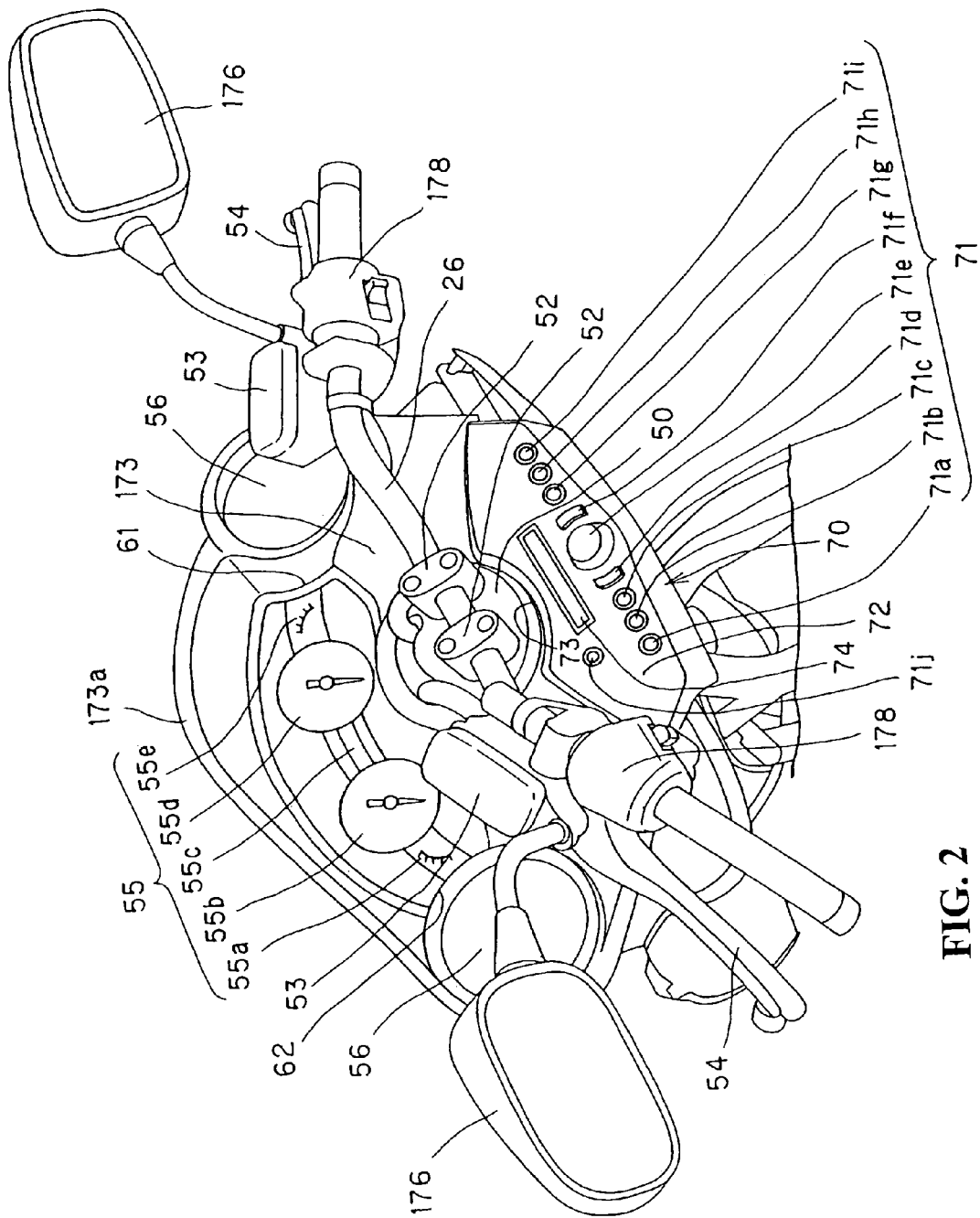
FIG. 2 is a perspective view showing a steering portion including a steering handle of such a construction.
Figure 3:
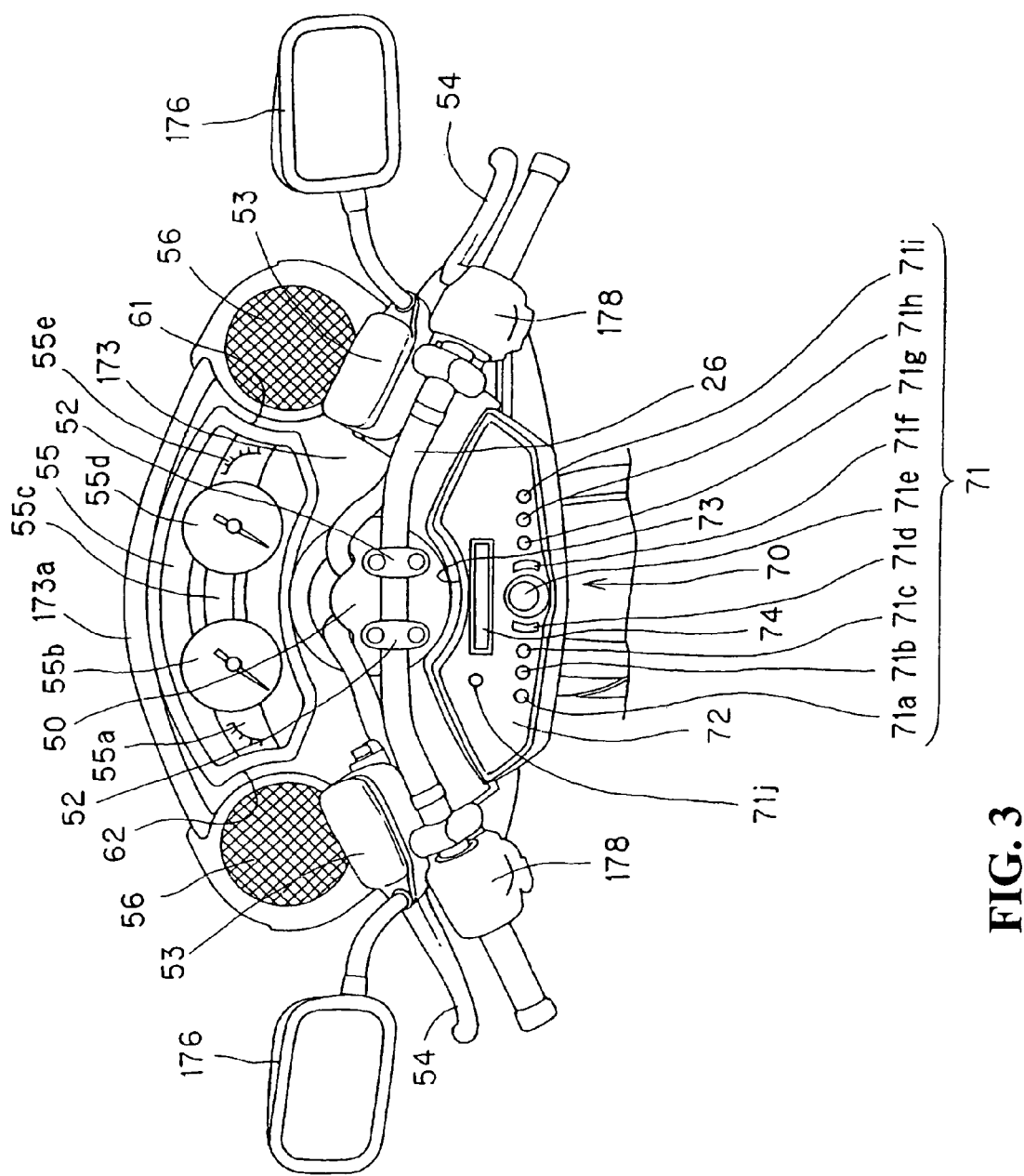
FIG. 3 is a view of the steering portion as viewed in the axial direction of a head pipe.

FIG. 2 is a perspective view of a steering portion of the scooter-type vehicle including the steering handle 26, and FIG. 3 is a view of the steering portion as viewed in the axial direction of the head pipe 27. As illustrated in FIGS. 1 and 2, a handle post 50 is mounted on an upper end of the steering stem 51 which is supported on the head pipe 27. On an upper surface of the handle post 50, as shown in FIG. 2, the steering handle 26 is mounted by way of a pair of holders 52, while on the steering handle 26, a brake master cylinder 53, a brake lever 54 and the like are mounted in addition to the back mirror 176 and the switch case 178 described above.

The meter panel 173 which integrally forms the meter visor 173a on a front portion thereof is arranged in front of the steering handle 26. Further, as shown in FIGS. 2 and 3, on the meter panel 173, a meter 55 which is provided for displaying information on the vehicle such as vehicle speed and an engine rotational speed and a pair of speakers 56 is mounted which is arranged close to both sides of the meter 55.

Figure 4:
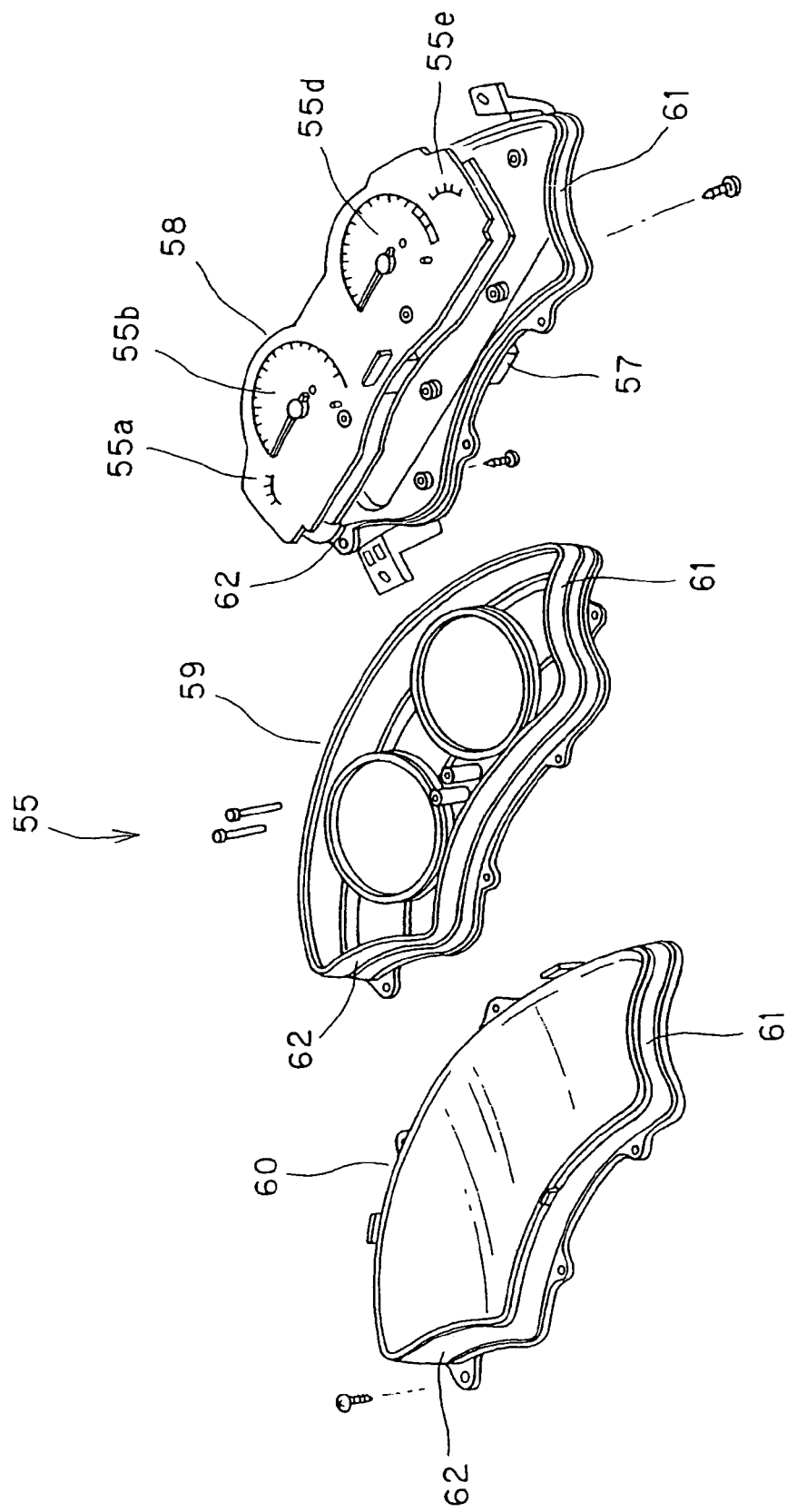
FIG. 4 is an exploded perspective view of a meter.

As shown in FIG. 1, the pair of speakers 56 respectively includes an approximately cylindrical case body 56a, and the case body 56a is arranged in a state wherein the case body 56a extends to be approximately parallel with the above-mentioned steering stems 51 and is inclined in the direction toward a front side of the vehicle. As shown in FIG. 4, the meter 55 includes a lower case 57, a meter body 58, a reflector plate 59 and a lens assembly 60. The lower case 57, the reflector plate 59 and the lens assembly 60 have approximately the same profile, and on both peripheral portions of the respective parts, escape portions 61, 62 which are indented inwardly in an approximately arcuate shape are formed.

As shown in FIGS. 2 and 3, the escape portions 61, 62 correspond to an approximately circular shape of the speakers 56 which are arranged on both sides of the meter 55, and outer peripheral portions of the speakers 56 are arranged close to and are fitted in the escape portions 61, 62. Thus, it is possible to decrease a longitudinal size of the meter panel 173. Due to such a construction, the meter panel 173 per se is miniaturized. Thus, the construction around the handle steering portion can be formed in a compact shape. On the meter 55, various kinds of display means on the vehicle such as a fuel gauge 55a of a fuel tank, a speedometer 55b, a digital display clock 55c, an engine tachometer 55d and a water temperature gauge 55e are mounted in order from a left side in the drawing. On the above-mentioned escape portions 61, 62 sides which are arranged close to the speakers 56, as the display means other than the speedometer 55b and the engine tachometer 55d, the water temperature gauge 55e, the fuel gauge 55a and the like are respectively arranged. The water temperature gauge 55e, the fuel gauge 55a and the like do not display required information during traveling. Thus, these parts are compactly displayed on the meter side portions arranged close to the speakers 56. Due to such a construction, the speedometer 55b, the engine tachometer 55d and the like for displaying particularly required information during traveling are displayed on the center of the meter in a magnified manner thus enhancing the visibility of these parts.

In this construction, around the above-mentioned handle steering portion, a sound operation unit 70 which provides a reproduction operation and the like of the sound system is mounted. The sound operation unit 70 is formed as a body separately from the meter 55. As shown in FIG. 3, the sound operation unit 70 is arranged behind the head pipe 27 as viewed in the axial direction of the head pipe 27 (see FIG. 1), that is, on a rider side. The meter 55 is arranged in front of the head pipe 27, that is, on a side remote from the rider side.

The sound operation unit 70 includes the panel body 72, and an approximately arcuate escape portion 73 in which an outer peripheral portion of the handle post 50 is fitted and is formed on a front periphery of the panel body 72. On a surface of the panel body 72, a laterally elongated display portion 74 which displays the sound reproduction information or the like thereon is mounted in a state wherein the display portion 74 is arranged adjacent to the escape portion 73. Further, a plurality of operational portions 71 are arranged in an approximately lateral row to be approximately parallel to the display portion 74. These operational portions 71 include an external sound input operation portion (AUX) 71a, an AM radio operation portion 71b, an FM radio operation portion 71c (these three parts described above being referred to as sound switching operation portions), a minus tuner 71d for performing the selection of a radio station or the selection of music, a volume control portion 71e on a control of a sound volume, a plus tuner 71f for performing the selection of a radio station or the selection of music, a traffic information receiving operational portion 71g, a muting electronic volume control portion 71h, and a low-and-high sound balance adjusting operational portion 71i for performing a sound operation and the like in order from a left side in the drawing. A power source operational portion 71j is arranged on a lateral side of the display portion 74. In this construction, the volume control portion 71e is arranged in the vicinity of the steering portion and, at the same time, at an approximately center portion of the panel body 72 of the sound operation unit 70.

Figure 5:
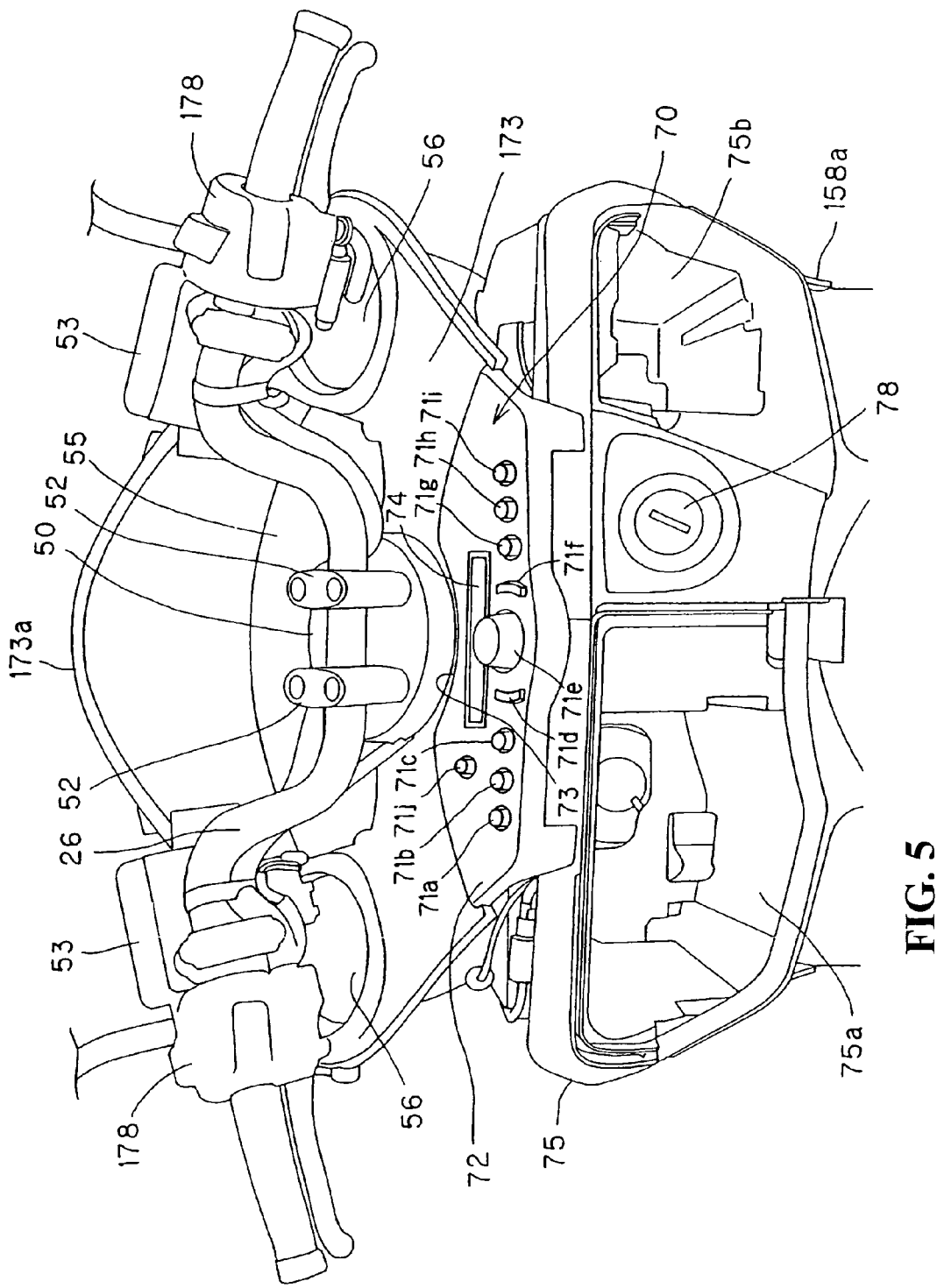
FIG. 5 is a view of a sound operation unit as viewed from a side of a rider's seat.
Figure 6:
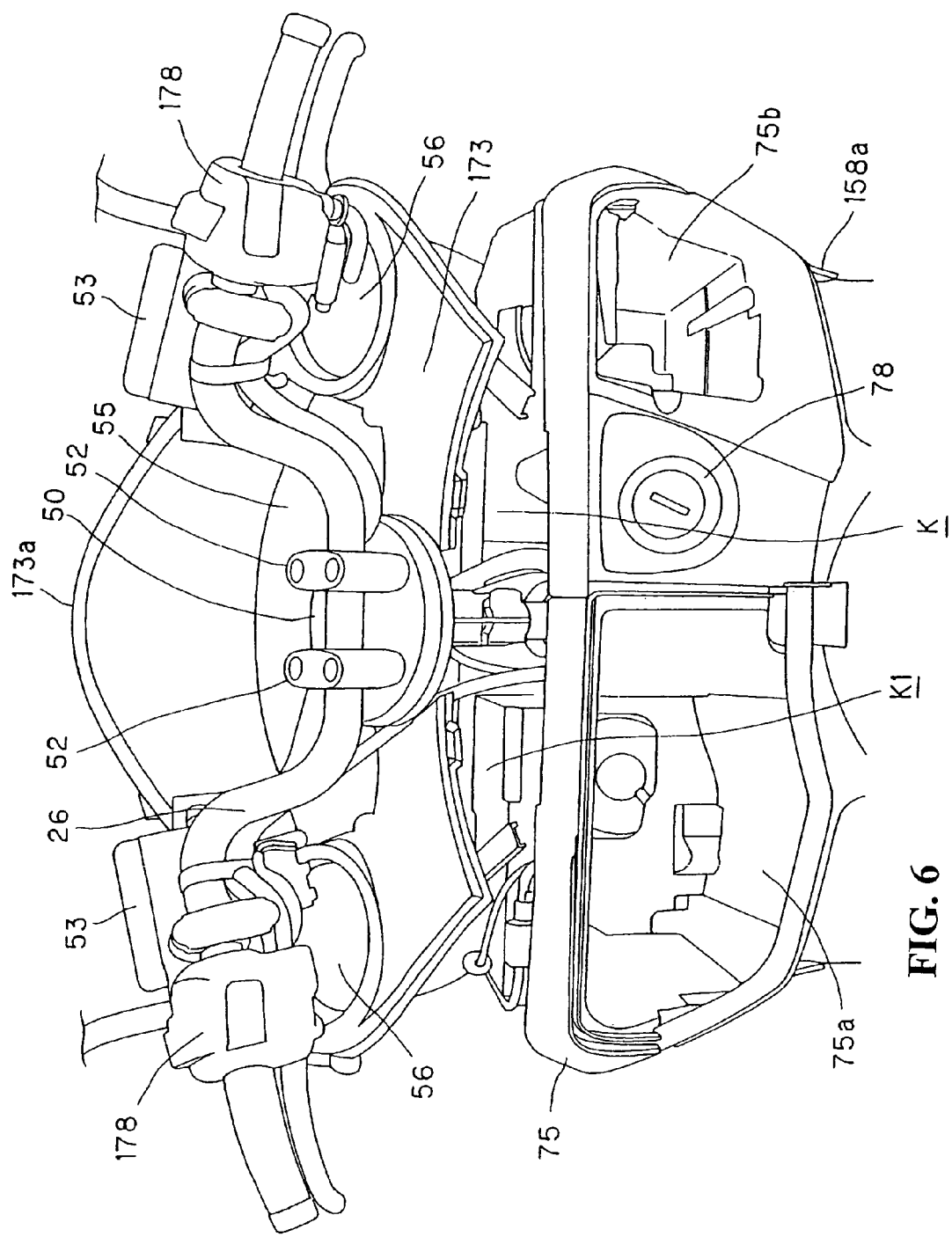
FIG. 6 is a view shown in FIG. 5 as viewed from the side of the rider's seat while removing the sound operation unit.

FIG. 5 is a view of the sound operation unit 70 as viewed from a rider's seat side, and FIG. 6 is a view corresponding to FIG. 5 as viewed from a rider's seat side in a state that the sound operation unit 70 is removed. As shown in FIG. 5, the inner box (a storing box) 75 which is formed in the above-mentioned inner cover 158a (see FIG. 1) is arranged below the sound operation unit 70, and in left and right openings 75a, 75b formed in the inner box 75, a pocket cowl 77 (see FIG. 1) with a pocket cover 76 (see FIG. 1) is arranged for storing small articles in a drawable manner. An engine start switch 78 is provided. As shown in FIG. 6, a space K is defined between an upper surface of the inner box 75 and the meter panel 173 on which the meter visor 173a is integrally formed.

Figure 7:
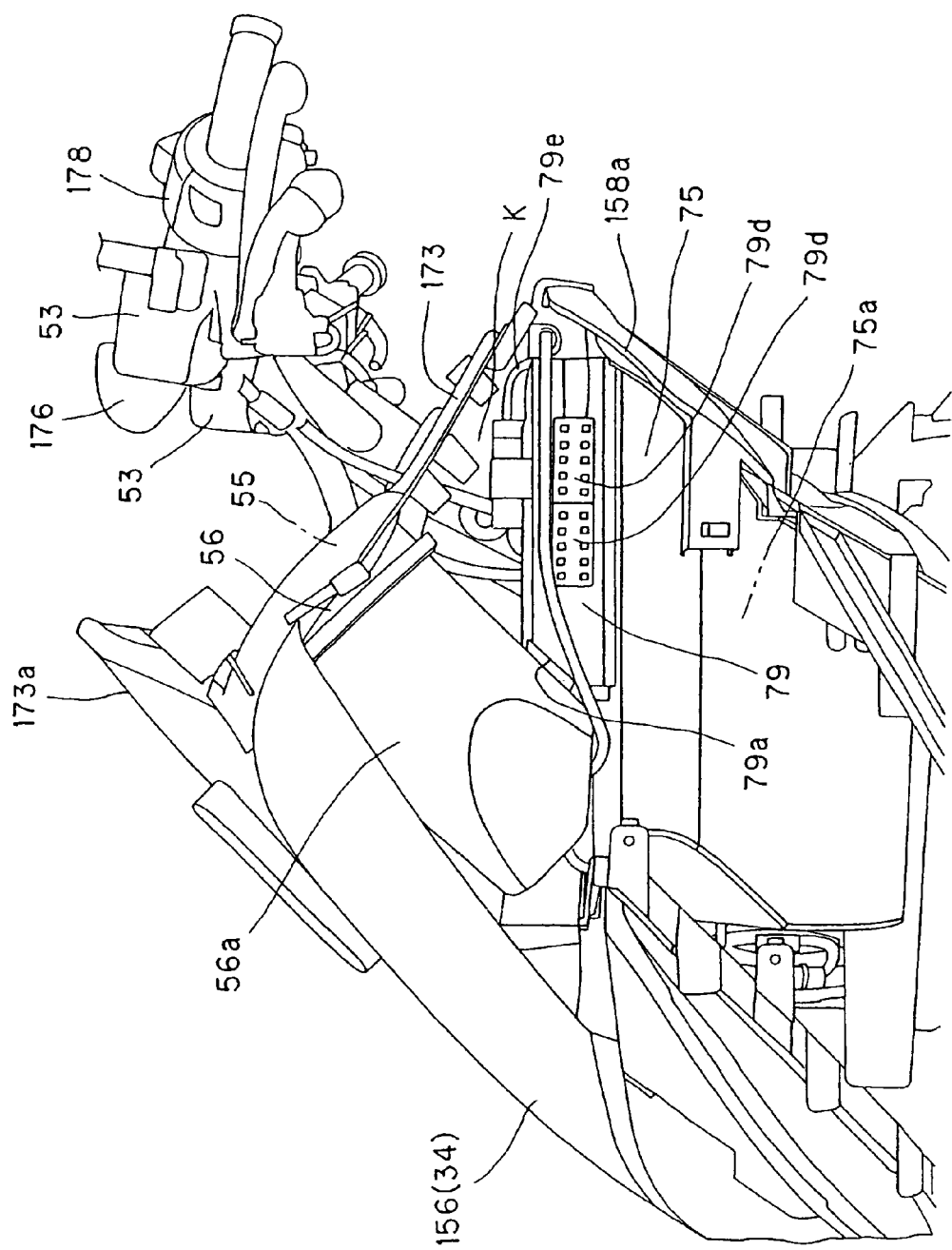
FIG. 7 is a side view showing the constitution around an inner box.
Figure 8:
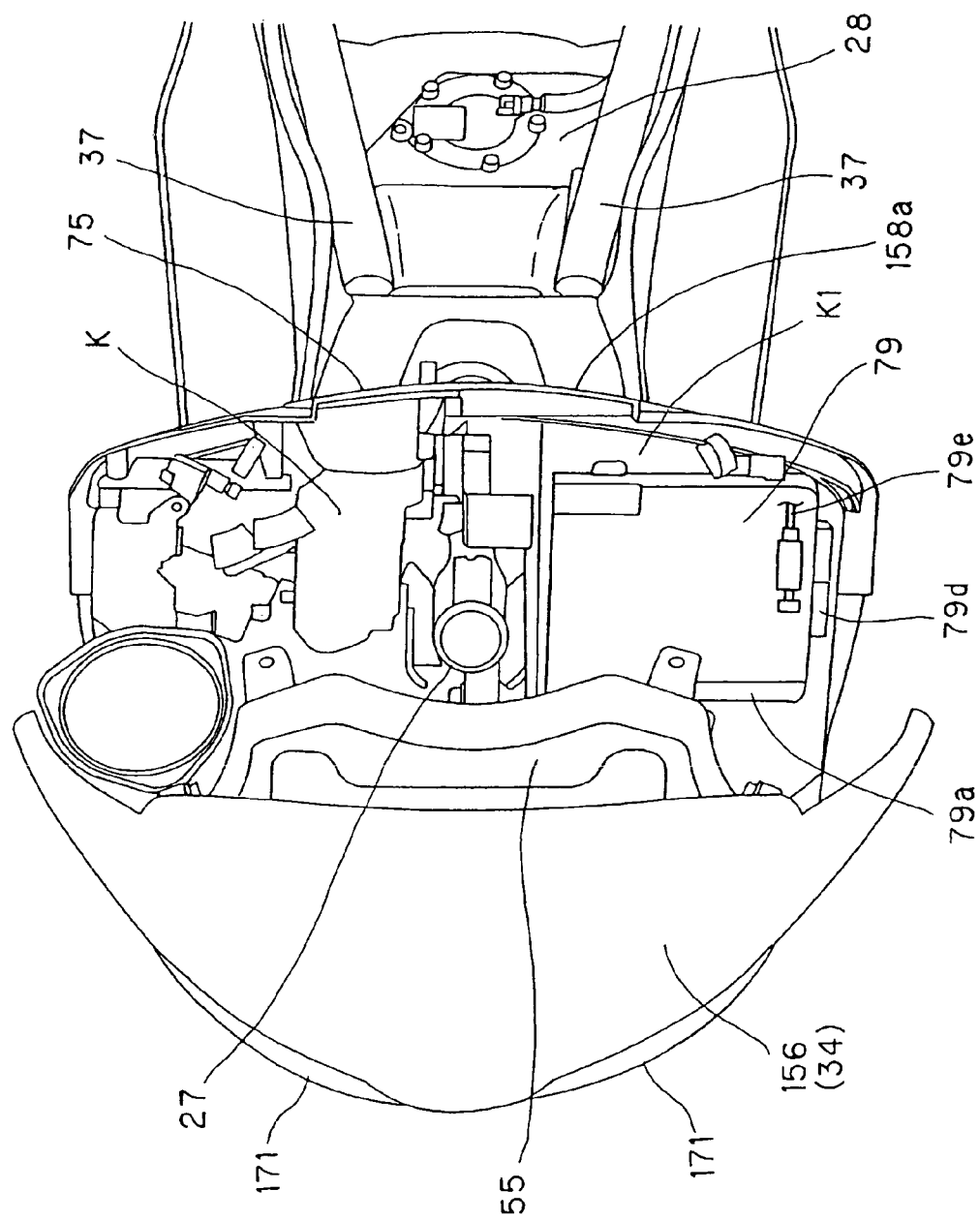
FIG. 8 is a plan view showing the constitution around the inner box.
Figure 9:
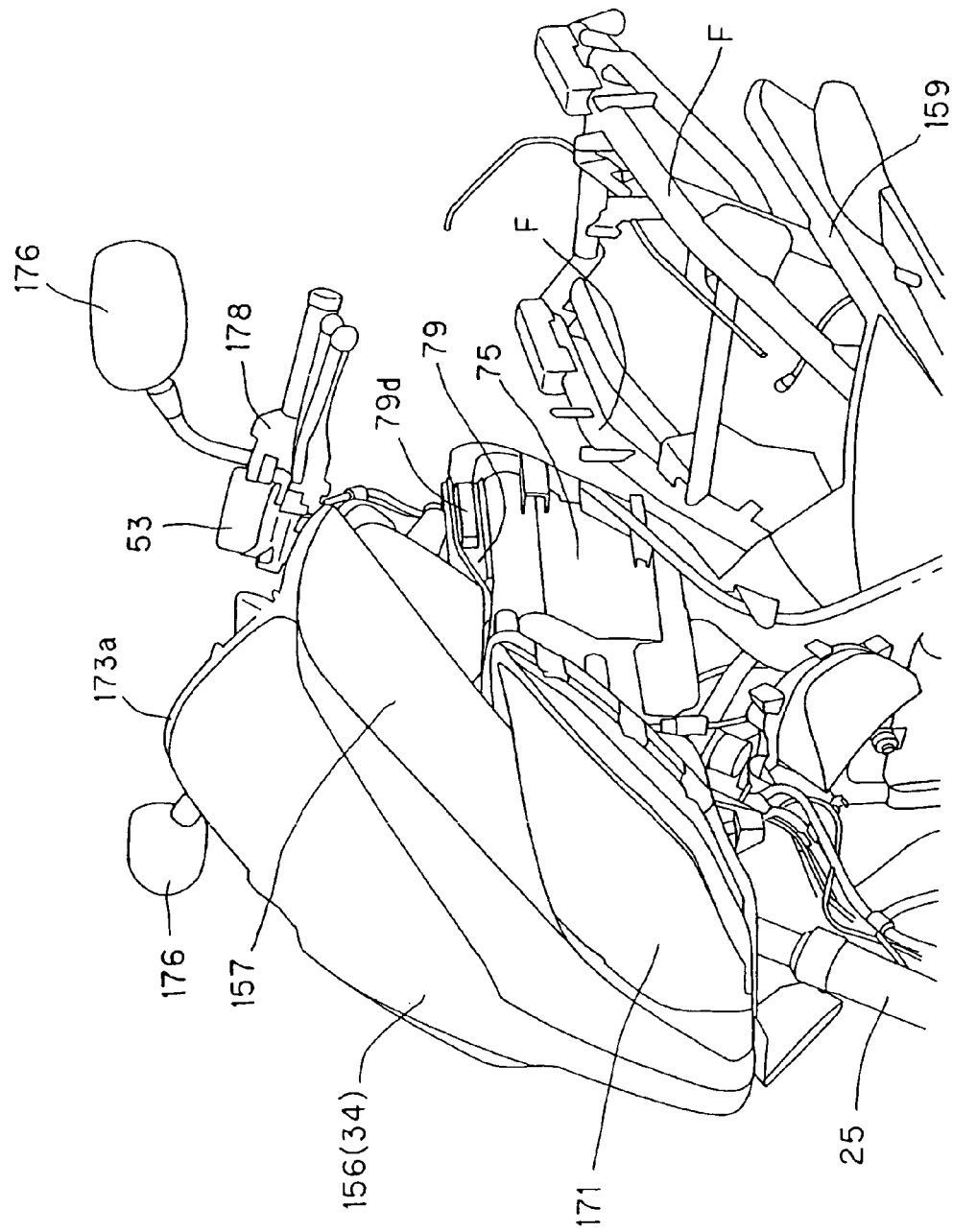
FIG. 9 is a perspective view showing the constitution around the inner box.

FIG. 7 is a side view showing the constitution around the inner box 75, FIG. 8 is a top plan view showing such a constitution, and FIG. 9 is a perspective view showing such a constitution. As shown in FIG. 7, the above-mentioned space K is an approximately triangular space K in a side view which is surrounded by an upper surface of the inner box 75 which is arranged approximately horizontally. The meter panel 173 is arranged in an inclined manner in the frontward and upward direction with a predetermined angle, and case bodies 56a of the speakers 56 are arranged in an inclined manner in the frontward and downward direction with a predetermined angle. A side surface portion of the space K is covered with the front side cover 157. With respect to the space K, in the inside of a space K1 which is positioned above a left opening 75a of the inner box 75, as shown in FIG. 7 to FIG. 9, a sound part 79 is arranged in an approximately horizontal state. The sound part 79 constitutes the sound system and is connected to a battery power source, the pair of speakers 56 and the sound operation unit 70 by way of connectors 79d (FIG. 7).

Further, although not shown in the drawing, the sound part 79 houses a power amplifier which changes a sound volume in an interlocking manner with an operation of the volume control portion 71e, AM and FM radio receivers which are connected to an antenna (not shown in the drawing) arranged on a rear portion of a vehicle body by way of an antenna line 79e (FIG. 7) and the like. Further, the sound part 79 includes an external sound input terminal which allows the connection of a portable audio player (not shown in the drawing) to the sound part 79, a connection terminal for a control line and the like. These terminals (not shown in the drawing) extend into the inside of an inner space of the left opening 75a of the inner box 75 which is positioned approximately right below the sound part 79, and the terminals can be connected to the portable audio player in the inside of the space. A casing of the sound part 79 has an approximately rectangular shape. On a deep end portion of the casing of the sound part 79, an escape portion 79a (FIG. 7) which is inclined in the oblique frontward direction for avoiding the case body 56a is formed for preventing the casing of the sound part 79 from interfering with the case body 56a of the speaker 56.

In this construction, as shown in FIG. 1, the sound part 79 and the unit swing engine UE are largely separated from each other in distance. The unit swing engine UE is arranged below the pair of left and right upper down frames 37 which is contiguously mounted on the head pipe 27 and extends in the rearward and downward direction. The sound part 79 is arranged in the vicinity of the handle steering portion as described above. According to the above-mentioned construction, the sound part 79 is separated from the engine UE which constitutes a noise generating source. Thus, it is possible to reduce the influence of the noises of the engine asserted on the sound part 79.

Next, the manner of operation of the sound system is explained.

In FIG. 3, when the sound system is turned on using the power source operational portion 71j and either one of the AM radio operational portion 71b and the FM radio operational portion 71c is operated, a sound source is switched to either one of the AM radio and the FM radio. Then, by operating the operation portion 71, it is possible to play the above-mentioned radio sound source using the pair of speakers 56 which are arranged in the vicinity of the handle steering portion. Thus, by operating either one of the minus tuner 71d and the plus tuner 71f, it is possible to select the radio station, and by operating the volume control portion 71e which is arranged at an approximately center of the sound system, it is possible to control a sound volume. By operating the traffic information receiving operation portion 71g, the sound source is switched to a mode for receiving traffic information on a speedway, and by operating the muting electronic volume control portion 71h, the sound source is switched to a muting mode.

The portable audio player, for example, an i-Pod (a registered trade mark) is connected to the respective terminals (not shown in the drawings) which extend into the inside of the inner space of the left opening 75a of the inner box 75, and the sound source of the sound system is switched to an external sound input mode by operating the external sound input operation portion 71a. Thereafter, by operating the operation portion 71, it is possible to play music stored in the portable audio player using the pair of speakers 56 which is arranged in the vicinity of the handle steering portion. In this case, by operating either one of the minus tuner 71d and the plus tuner 71f, the selection of music is performed, while by operating the volume control portion 71e arranged at the approximately center of the sound system, a volume control is performed.

Also in this case, by operating the traffic information receiving operation portion 71g, the external sound input mode is switched to a mode for receiving traffic information on a speedway, while by operating the muting electronic volume control portion 71h, the external sound input mode is switched to a muting mode.

In this embodiment, as shown in FIGS. 2 and 3, the meter 55 for displaying the information on the vehicle and the sound operation unit 70 which instructs the reproduction operation and the like in the sound system are constituted as bodies separate from each other. Accordingly, compared to the constitution in which these parts are present in a mixture, the visibility of the meter 55 for the rider can be enhanced. During the traveling of the vehicle, it is necessary to confirm a meter display of the meter 55. Thus, the visibility of the meter 55 is important. However, the meter 55 is arranged in front of the head pipe 27, that is, on a side remote from the rider. Thus, the rider can ensure sufficient visibility of the meter 55. Further, the sound operation unit 70 is arranged behind the head pipe 27, that is, close to the rider side. Thus, the operability of the sound operation unit 70 can be enhanced while ensuring the visibility of the meter 55.

On the sound operation unit 70, the plurality of operational portions 71 for performing the sound operation or the selection of music is mounted. Among these operational portions 71, the frequently-used volume control portion 71e on the volume control is arranged in the vicinity of the steering portion and on the center position of the panel body 72 of the sound operation unit 70. Accordingly, when the rider performs a handle operation, the volume control portion 71e is always held close to the center of the steering portion thus further facilitating the operation of the volume control portion 71e.

In this construction, as shown in FIG. 7, in the inside of the space K which is a dead space surrounded by the upper surface of the inner box (storing box) 75, the meter panel 173 and the case body 56a of the speaker 56, the sound part 79 is arranged. Accordingly, it is possible to effectively use a dead space which originally exists in the sound system. Thus, it is unnecessary to decrease a storing capacitance of the storing box. More particularly, in the scooter-type vehicle, storing space is limited. Thus, by making use of the above-mentioned construction, it is possible to efficiently arrange the sound part.

In this construction, the sound part 79 is arranged on the upper surface of the inner box (storing box) 75 formed on the inner cover 158a which is arranged close to the sound operation unit 70. Thus, a physical distance between the sound part 79 and the sound operation unit 70 can be shortened. Accordingly, when the sound part 79 and the sound operation portion 70 are connected with each other by way of the cable, a length of the cable can be shortened. Thus, it is possible to prevent a loosening or slacking of the cable and, at the same time, it is possible to prevent the cable from being entangled with other equipment or a vehicle-mounted device.

In this construction, as shown in FIG. 7, the sound part 79 is arranged below the meter panel 173. Thus, it is unnecessary to provide specific water-proof equipment for the sound part 79 or to impart a water-proof function to the sound part 79. The waterproof-equipped meter panel 173 is used as a roof and ensures the water-proof property of the sound part 79.

In this construction, as shown in FIG. 7, the escape portion 79a which is formed in an inclined manner in the oblique frontward direction for avoiding the case body 56a of the speakers 56 is formed in the sound part 79. Accordingly, when the sound part 79 is arranged in the space K, no useless space is formed between the sound part 79 and the case body 56a.

Thus, the sound part 79 and the case bodies 56a can be arranged close to each other as much as possible thus efficiently arranging the sound part 79 in the space K.

In this construction, as shown in FIGS. 2 and 3, the escape portions 61, 62 are formed in the meter 55, the escape portions 61, 62 correspond to an approximately circular shape of the speakers 56 which are arranged on both sides of the meter 55. Thus, it is possible to decrease a longitudinal size of the meter panel 173 by allowing the outer peripheral portions of the speakers 56 to approach and to be fitted in the escape portions 61, 62. Due to such a construction, the meter panel 173 per se is miniaturized. Thus, it is possible to form the construction around the handle steering portion in a compact shape.

In this construction, on the meter 55, the water temperature gauge 55e, the fuel gauge 55a and the like which display the information unnecessary during traveling are displayed on side portions of the meter which are arranged close to the speakers 56 in a compact shape, and the speedometer 55b, the engine tachometer 55d and the like which display the information particularly necessary during traveling are displayed on the center of the meter in a magnified manner. Due to such a construction, it is possible to enhance the visibility of these parts.

The above-mentioned embodiment merely constitutes one embodiment of the invention, and modifications and applications are arbitrarily conceivable without departing from the gist of the invention. For example, the invention is not limited to the scooter-type vehicle and is also applicable to various kinds of motorcycles such as a road-sport-use vehicle and a dual-purpose vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of a sound system in a motorcycle which arranges a meter indicating information on a vehicle and a sound operation unit for providing a reproduction operation or the like in the sound system in the vicinity of a steering portion, comprising:
the meter and the sound operation unit are constituted as bodies separate from each other, the meter is arranged, as viewed in the axial direction of a head pipe which supports the steering portion, in the vicinity of and in front of the head pipe, and the sound operation unit is arranged, as viewed in the axial direction of the head pipe, in the vicinity of and behind the head pipe with a bottom edge of the meter and the upper edge of the sound operation unit being arc shaped.

2. The arrangement structure of a sound system in a motorcycle according to claim 1, wherein the sound operation unit includes a plurality of operation portions for performing sound operations, and among the operational portions, the operation portion on sound volume control is arranged in the vicinity of a steering portion and at an approximately center portion of the sound operation unit.

3. The arrangement structure of a sound system in a motorcycle according to claim 1, wherein the sound operation unit includes a plurality of operational portions for performing the selection of stations or the like, and among the operational portions, the operational portion on sound volume control is arranged in the vicinity of a steering portion and at an approximately center portion of the sound operation unit.

4. The arrangement structure of a sound system in a motorcycle according to claim 1, wherein the sound system includes a meter panel which extends rearwardly from a front side of the steering portion, and the meter and the sound operation unit are arranged on the meter panel.

5. The arrangement structure of a sound system in a motorcycle according to claim 2, wherein the sound system includes a meter panel which extends rearwardly from a front side of a steering portion, and the meter and the sound operation unit are arranged on the meter panel.

6. The arrangement structure of a sound system in a motorcycle according to claim 3, wherein the sound system includes a meter panel which extends rearwardly from a front side of the steering portion, and the meter and the sound operation unit are arranged on the meter panel.

7. The arrangement structure of a sound system in a motorcycle according to claim 1, and further including a meter panel, said meter being disposed in said meter panel for displaying information relating to vehicle speed and engine rotational speed.

8. The arrangement structure of a sound system in a motorcycle according to claim 7, wherein said meter panel includes a meter visor on a front portion thereof for providing a screen for said meter panel.

9. The arrangement structure of a sound system in a motorcycle according to claim 7, and further including at least one speaker operatively mounted relative to said meter panel for generating a sound from the sound system.

10. The arrangement structure of a sound system in a motorcycle according to claim 1, and further including an audio player operatively connected to said sound operation unit for enabling a connection of a portable audio player thereto.

11. An arrangement structure adapted for use with a motorcycle comprising:
a head pipe;
a meter for indicating information on a vehicle;
a sound operation unit for providing a reproduction operation in a sound system in the vicinity of the head pipe;
wherein the meter and the sound operation unit are separate from each other with the meter being arranged, as viewed in the axial direction of the head pipe, in the vicinity of and in front of the head pipe, and the sound operation unit is arranged, as viewed in the axial direction of the head pipe, in the vicinity of and behind the head pipe with a bottom edge of the meter and the upper edge of the sound operation unit being arc shaped.

12. The arrangement structure adapted for use with a motorcycle according to claim 11, wherein the sound operation unit includes a plurality of operation portions for performing sound operations, and among the operational portions, the operation portion on sound volume control is arranged in the vicinity of a steering portion and at an approximately center portion of the sound operation unit.

13. The arrangement structure adapted for use with a motorcycle according to claim 11, wherein the sound operation unit includes a plurality of operational portions for performing the selection of stations, and among the operational portions, the operational portion on sound volume control is arranged in the vicinity of a steering portion and at an approximately center portion of the sound operation unit.

14. The arrangement structure adapted for use with a motorcycle according to claim 11, wherein the sound system includes a meter panel which extends rearwardly from a front side of a steering portion, and the meter and the sound operation unit are arranged on the meter panel.

15. The arrangement structure adapted for use with a motorcycle according to claim 12, wherein the sound system includes a meter panel which extends rearwardly from a front side of a steering portion, and the meter and the sound operation unit are arranged on the meter panel.

16. The arrangement structure adapted for use with a motorcycle according to claim 13, wherein the sound system includes a meter panel which extends rearwardly from a front side of a steering portion, and the meter and the sound operation unit are arranged on the meter panel.

17. The arrangement structure adapted for use with a motorcycle according to claim 11, and further including a meter panel, said meter being disposed in said meter panel for displaying information relating to vehicle speed and engine rotational speed.

18. The arrangement structure adapted for use with a motorcycle according to claim 17, wherein said meter panel includes a meter visor on a front portion thereof for providing a screen for said meter panel.

19. The arrangement structure adapted for use with a motorcycle according to claim 17, and further including at least one speaker operatively mounted relative to said meter panel for generating a sound from the sound system.

20. The arrangement structure adapted for use with a motorcycle according to claim 11, and further including an audio player operatively connected to said sound operation unit for enabling a connection of a portable audio player thereto.

* * * * *